United States Patent Office 3,748,147
Patented July 24, 1973

3,748,147
PROCESS FOR THE PIGMENTATION OF POULTRY
Douglas Hale and Wesu C. Ng, St. Louis, Mo., assignors to Ralston Purina Company, St. Louis, Mo.
No Drawing. Continuation-in-part of application Ser. No. 28,062, Apr. 13, 1970. This application Dec. 16, 1971, Ser. No. 208,981
Int. Cl. A22c 21/00; A23l 1/27
U.S. Cl. 99—107    6 Claims

ABSTRACT OF THE DISCLOSURE

An improved process for pigmenting poultry by a direct dyeing technique is provided for by carefully controlling the temperature and time of scalding during processing of the poultry to allow the uniform application of a mixed dye solution to the surface of the processed poultry and impart a level of pigmentation which correlates to a commercially accepted scale of skin pigmentation.

BACKGROUND OF THE INVENTION

This application is a continuation-in-part application of our prior application Ser. No. 28,062 filed Apr. 13, 1970, now abandoned.

This invention relates to an improved process for pigmenting poultry by a direct dyeing technique.

One of the most difficult problems of the poultry and poultry products industry has been uniform pigmentation of eggs and processed poultry. The golden yellow color which is considered by the consumer to be representative of the highest quality processed poultry products is very much in demand but, accordingly, has been difficult to consistently attain, since the color in the skin of poultry products, such as broilers, fryers, etc., result from natural pigments which are ingested and utilized by the poultry in their diet, then deposited generally beneath the surface of the skin to impart a characteristic golden yellow color to the skin of the poultry when slaughtered and processed. Consistent reproduction of this yellow color in the skin of poultry has been very difficult to attain primarily because the pigments which cause the yellow pigmentation are generally various types of polyoxygenated carotenoids, such as xanthophyll and derivatives thereof which are available from various natural grains and plants such as alfalfa, corn, corn gluten meal and marigolds as well as many other varieties of plants and plant by-products. In addition, these pigment materials are found naturally in various chemical forms, that is to say, either as free alcohols, as esters with various fatty acids, or in combination with various other lipoidal materials. Likewise, many of these natural pigment materials, because of the chemical variance in which they naturally occur, as well as their general instability and extreme sensitivity to heat, light, etc., or other physical and chemical forms of stress, do not provide a consistently predictable means of attaining uniform pigmentation in the skin of poultry. For example, esterified derivatives may be either completely unavailable to the poultry or deposited only in one area of the body. Likewise, other chemical derivatives of these materials result in different and varying pigmentation effects. Thus, it is difficult to formulate a feed for pigmentation purposes which will produce consistently a desired level of pigmentation while maintaining a wide choice among ingredients needed to produce the effect. Likewise, processing of these natural sources of these pigments, while resulting in better utilization of the pigments because of hydrolysis of the esterified or other derivatives, also adds to the cost involved in formulating the diet and offsets to a great degree the increased pigmenting powers of the saponified or hydrolyzed carotenoid materials. The addition of various synthetic dyes to the diet of poultry has also been proposed, but, regardless of the usefulness of these in providing a consistent and reproducible source of pigmentation, they also significantly raise the cost of the diet and prove to be impractical in commercial application.

We have therefore developed a process for imparting pigmentation to processed poultry by a direct dyeing technique which is both simple, economical and which results in a consistent and uniform deposition of pigment in the skin of the poultry. It has the advantage over pigmentation by dietary means of being extremely economical and reliable to practice on a commercial scale.

SUMMARY OF THE INVENTION

We have developed a process of pigmenting processed poultry by a direct dyeing technique which is of an improved nature and which imparts a highly uniform and reproducible pigmentation effect to the skins of the processed poultry or fowl.

The improvement which we have developed in pigmenting poultry by a direct dyeing technique lies in the area of controlling within certain well defined limits the temperature and time of processing the poultry so that consistently and highly uniform pigmentation effect is obtained by applying to the processed poultry a dye solution or mixture of dye solutions. We have also established, within the operative ranges of our improved process for pigmentation of poultry, concentrations of various dyes which, when used within the limits of the process of the present invention, impart highly uniform pigmentation to the skin of the bird which is of a commercially acceptable standard and quality.

An object, therefore, of the present invention is to provide an improved process for pigmenting poultry by a direct dyeing technique comprising the steps of slaughtering the poultry, scalding the poultry for a certain period of time within a well defined temperature range, then defeathering the poultry, and applying a dye solution to the poultry to impart a golden yellow color to the skin.

DESCRIPTION OF THE PREFERRED EMBODIMENTS

The improved process which we have developed for imparting color to the skin of processed poultry comprises slaughtering the poultry or fowls and then scalding the poultry with hot water or steam for a certain period of time. We have found that a uniform and consistent degree of pigmentation can be accomplished by directly dyeing the poultry, if the scalding is carefully controlled within certain critical temperature limits for a certain period of time. Specifically, we have found it necessary to control the scalding between 130° F. and 145° F. preferably 134° F.–138° F. and in turn subject the poultry to this temperature for a period of time ranging between 30 seconds and 5 minutes preferably 2 to 2½ minutes. The scalding may be carried out with any conventional equipment which is deemed to be acceptable for the commercial processing or steam scalding of poultry, and the present invention is not limited to the type of equipment or the means used for scalding the poultry within this temperature range. We have found that when this critical temperature range for the scalding step is employed, the most consistent and uniform degree of pigmentation of the skin may be accomplished, when the bird is later defeathered and a dye is applied, which may be either by spraying or other means as well as dipping in a dye solution. When temperatures above or below this range are employed we find the dyeing to be non-uniform and spotty. While it is not completely understood why this temperature range is critical to attaining a uniform quality to the yellow color imparted by a direct dyeing technique, nevertheless, it may be theorized that at this temperature maximum opening of all of the pores of the skin is attained and results in the uniform deposition of dye in the pores below the subsurface of the skin. The time for which the poultry should be subjected to this scalding temperature is between 30 seconds and 5 minutes. If the temperature range is maintained within this period of time, the best pigmentation effects are attained, and subjecting the poultry to these scalding temperatures within this period of time has the additional advantage and also serves the purpose of allowing easy removal of feathers during the defeathering step.

After the poultry has been subjected to a scalding temperature of 130° F. to 145° F. for a period of time within 30 seconds to 5 minutes, they are conveyed to a picking machine or other type of equipment for defeathering. The particular apparatus or means of defeathering is not critical to the process of the present invention and may be any commercially available piece of equipment or process used for this purpose.

The poultry, after defeathering and preferably prior to eviscerating, is then ready for a dye solution to be applied. If desired the dye may be applied following evisceration, however there is a tendency for the dye to color the exposed meat which may not be desirable. The dye solution is applied for a predetermined period of time to achieve the degree of pigmentation desired. Although the present invention is not limited to any particular dye, since any dye or mixture of dyes which can give the requisite yellow color can be employed. It is, of course, necessary that said dyes be deemed acceptable for food use. Likewise, application of the dye may be made by spraying or other means, although the easiest means of applying the dye for commercial practice is simply dipping the poultry in the dye solution. Advantageously, we have also found water soluble dyes to be highly acceptable for use in the present process, since they are readily and easily prepared by forming an aqueous solution thereof. Accordingly, the specific dyes or mixtures thereof which are preferred for the improved process we have developed are FD & C Yellow #5 which is the trisodium salt of 3-carboxy 5-hydroxy-1-p sulfophenyl-4-p sulfophenyl azopyrazole; FD & C Yellow #6 which is the disodium salt of 1-sulfophenylazo-2-naphtol-6-sulfonic acid and, a water soluble form of bixin which is a carotenoid, a monomethyl ester of a mono-cis-polyene dicarboxylic acid or the water soluble salt thereof. All are considered acceptable for food use and when used together in a mixture, may be alternately varied in concentration to impart the color desired. We have found that by varying concentrations of a mixture of FD & C Yellow #5 and #6, and bixin a dye solution is obtained which, when combined with the process of scalding set forth in the present invention, allows any degree of pigmentation to be imparted to the skin, as measured by a commercially accepted scale or color index which is deemed acceptable or preferable to be obtained.

It has been found that by varying the combinations of FD & C Yellow #5, FD & C Yellow #6 and bixin a desired dye solution may be obtained for achieving commercially acceptable poultry pigmentation. If a very light yellow color pigmentation is desired, satisfactory results may be obtained by forming an aqueous dye solution containing 50 p.p.m. bixin and 20 p.p.m. FD & C Yellow #5 or a dye solution of 50 p.p.m. bixin and 20 p.p.m. FD & C Yellow #6. If a dark color tone for the poultry skin is desired, satisfactory results have been obtained by forming an aqueous dye solution containing 100 p.p.m. bixin and 40 p.p.m. FD & C Yellow #5 or a dye solution of 100 p.p.m. bixin and 40 p.p.m. FD & C Yellow #6. Also, a light yellow color pigmentation may be obtained by forming an aqueous dye solution containing 459 p.p.m. FD & C Yellow #5 and 51 p.p.m. FD & C Yellow #6. If a dark yellow color pigmentation is desired, satisfactory results have been obtained by forming an aqueous dye solution containing 2780 p.p.m. FD & C Yellow #5 and 309 p.p.m. FD & C Yellow #6. Generally the FD & C Yellow #5 will be used by weight in a quantity 9 times that of the amount by weight of FD & C Yellow #6 which is employed. Of course, other combinations of bixin FD & C Yellow #5 and FD & C Yellow #6 could be utilized in order to obtain the desired pigmenting of the poultry. However, within the concentration of the previously described dye solutions the most desirable pigmentation for commercial acceptance is obtained. Such dye concentrations would yield comparable pigmentation as if the poultry had been raised on a diet of feeds containing 10 p.p.m.–40 p.p.m. xanthophyl for pigmenting the poultry.

Therefore, although any dyes or mixtures thereof which produce the requisite color can be used, the use of various mixtures of FD & C Yellow #5, #6, and bixin provides a means of attaining the desired color.

Preferably, we have found it advantageous to hold the poultry in the dye solution for a period of time which can range between 2–3 seconds and 5 minutes; the particular time which is employed is not critical, since we have found that, regardless of the time of application, the skin color of the poultry is controlled primarily by the components of the dye solution and their respective concentration, coupled with the scalding conditions as opposed to the time the poultry is actually subjected to the dye solution, although the latter influences pigmenation although not to a highly significant degree.

Certain variations may be made in the time and means of application of the dye solution, and this may be readily determined by one skilled in the art, utilizing the respective dye solutions set forth in the present invention and reasonable variations in time and means of application are intended to be covered by the invention herein. As typical examples however, using a dye solution of 75 p.p.m. bixin and 30 p.p.m. FD & C Yellow #5 to produce an intermediate yellow pigmentation of the poultry, a time of 2 to 3 seconds will be sufficient if the bird is sprayed with the dye solution, while if dipping is used as the means of application, an exposure time of about one minute may be required.

After the poultry are removed from the dye solution, they may be further processed and eviscerated, then packed in suitable containers for marketing. Alternatively, as previously discussed, subjection to the dye solution to impart color to the skin of the poultry can be carried out subsequent to evisceration of the poultry as well as prior to it, although the latter procedure may tend to color the meat somewhat; depending on the means of application. For example, if dipping is used the dye may enter the interior cavity of the bird and penetrate into the meaty interior of the bird. If this is not deemed desirable, then either spraying should be used or dipping in the dye solution should be carried out prior to evisceration.

Poultry which are pigmented by the direct dyeing technique of the present improved process are particularly characterized by a pigmentation with a high degree of uniformity and pleasing yellow appearance, resembling very closely a uniform pigment effect which a carefully controlled and formulated pigmentation diet would produce. One can recognize poultry produced by the improved process of the present invention as having a golden yellow color which is deemed to be representaitve of the highest quality poultry and poultry products from the visual appeal standpoint and, accordingly, are deemed most acceptable and preferable int he market place. There is an absence of spotting or blotching of color anywhere on the carcass of the poultry, thus resembling substantially a natural (pigmentation by dietary supplementation of the feed) as opposed to an artificial coloring process.

The following example is illustrative of the present invention:

Example 1

An aqueous dye solution which comprised a mixture of FD & C Yellow #5 and FD & C Yellow #6 was prepared b dissolving 7.6 gm. FD & C Yellow #6 and 68.6 gm. of FD & C Yellow #5 in 20 gallons of water. About 40 chickens were slaughtered and subjected to various scalding temperatures for about 1½ minutes, then defeathered on a continuous line and then dipped in the mixed dye solution for 20 seconds. The excess dye was rinsed off of the skin, the chickens were eviscerated and then packed. About one third of the chickens were subjected to a scalding temperature of 128° F. for 1½ minutes before dipping in the dye solution for 20 seconds. The dye pick up on the skin of these chickens was very poor, blotched, and uneven, not resembling at all a natural pigmentation effect. Another one third of the chickens were subjected to a scalding temperature of about 135° F. for 1½ minutes before dipping in the dye solution for 20 seconds. The dye pick up and color of the skin of these chickens was quite uniform and even resembling closely the golden yellow color characteristic of a naturally occurring pigmentation effect. Another one third of the chickens were subjected to a scalding temperature of about 140° F. for 1½ minutes prior to dipping in the dye solution for 20 seconds. The pick up of the dye and skin color of these chickens closely simulated a natural pimentation effect and was quite uniform and even in nature, without splotching of the dye.

Example 2

An aqueous dye solution which comprised a mixture of FD & C Yellow #5 and bixin was prepared by dissolving 40 milligrams of tartrazine (FD & C Yellow #5) and 100 milligrams of bixin in a liter of water. Chickens which had been slaughtered and subjected to scalding temperatures of 130° F. for two and one-half minutes, were then defeathered on a continuous line, eviscerated and washed. The birds were sprayed with the dye solution for varying lengths of time to provide the desirable intensity of color. Another manner of providing the variable intensity of color can be achieved by increasing or decreasing the concentration of dyes in the ratio indicated above. The dye pick up and color of the skin of the chickens was quite uniform and resembled the characteristics of birds fed natural pigmented feeds.

The spirit and scope of our invention will be set forth in the appended claims, and it is our intention to cover thereby all equivalents and modifications as may reasonably be included within their scope.

We claim:

1. A process for controlling the pigmentation of processed poultry by direct dyeing comprising the steps of scalding said poultry at a temperature between about 130° F. to 145° F. for a period of time of about 30 seconds to 5 minutes, defeathering said poultry and applying an aqueous solution of a dye to pigment said poultry, the dye being selected from the group consisting of FD & C Yellow #5, FD & C Yellow #6, bixin and combinations thereof.

2. The process according to claim 1 wherein the scalding of said poultry is at a temperature between 134° F.–138° F. for a period of time of about 2–2½ minutes and the aqueous dye is applied for a period of time of about 2 seconds to about 5 minutes.

3. The process according to claim 1 wherein the aqueous dye solution contains 20 p.p.m.–40 p.p.m. FD & C Yellow #6 dye and 50 p.p.m.–100 p.p.m. of bixin.

4. The process according to claim 1 wherein the aqueous dye solution contains 20 p.p.m.–40 p.p.m. FD & C Yellow #5 dye and 50 p.p.m.–100 p.p.m. of bixin.

5. The process according to claim 1 wherein the aqueous dye solution contains 459 p.p.m.–2780 p.p.m. FD & C Yellow #5 and 51 p.p.m.–309 p.p.m. FD & C Yellow #6 dye.

6. The process according to claim 1 wherein the aqueous dye is applied for a period of time of about 2 seconds to about 5 minutes.

References Cited

UNITED STATES PATENTS

| | | | |
|---|---|---|---|
| 2,806,792 | 9/1957 | Cameron | 99—107 |
| 2,885,291 | 5/1959 | Sengelaub et al. | 99—107 |
| 3,162,538 | 12/1964 | Todd | 99—148 C |
| 3,489,573 | 1/1970 | Brankamp | 99—148 |

OTHER REFERENCES

"Chemical and Engineering News," Oct. 17, 1966, p. 124, Article entitled Food Additives, Part 2.

HYMAN LORD, Primary Examiner

U.S. Cl. X.R.

99—148